2,768,805

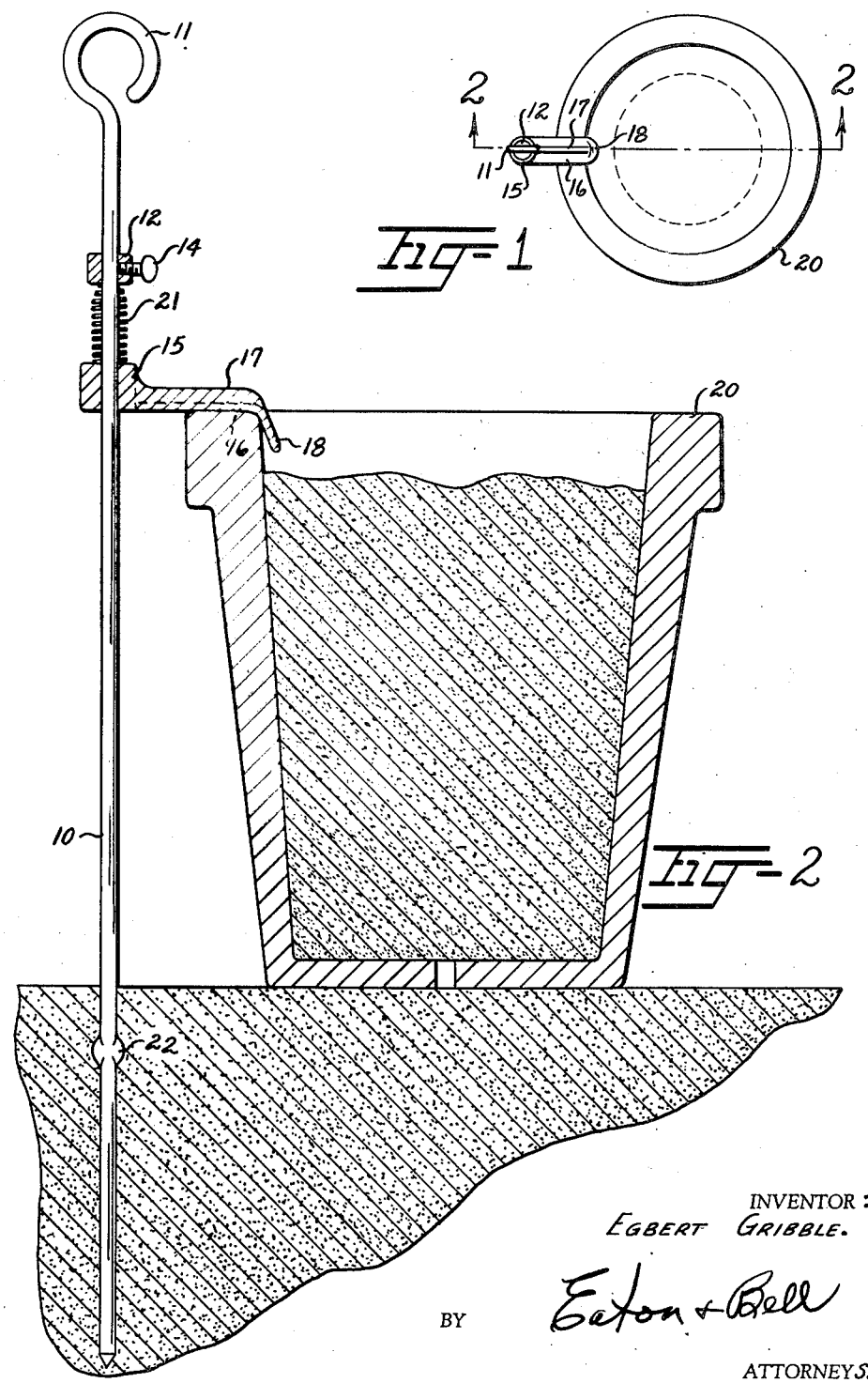

FLOWER POT OR VASE HOLDER

Egbert Gribble, Charlotte, N. C.

Application December 15, 1953, Serial No. 398,293

1 Claim. (Cl. 248—361)

This invention relates to means for preventing overturning of flower pots, vases and the like and is especially adaptable for preventing overturning of potted plants, vases and the like in cemeteries. It very often happens that vases, potted plants and the like placed in cemeteries, due to the high winds which prevail at times, are blown over and since no one is there to attend to same the flowers become ruined.

It is an object of this invention to provide a vase or flower pot holder which is adapted to be stuck into the ground and having a member slidable thereon provided with a downwardly turned free end which is adapted to resiliently press against the rim of the vase or pot and hold it against overturning in any direction.

Some of the objects of the invention having been stated, other objects will appear as the description proceeds when taken in connection with the accompanying drawings in which—

Figure 1 is a top plan view of the apparatus;

Figure 2 is a vertical sectional view through a portion of the apparatus and through a vase with the plant or flowers omitted from the same.

Referring more specifically to the drawings, the numeral 10 indicates an elongated shaft having a bent or circular handle portion 11 on the upper end thereof and a pointed lower end to enable the shaft 10 to be stuck into the ground. Adjustably mounted on the shaft 10 is a collar 12 which can be secured in a desired adjusted position by means of a set screw 14 and also slidably mounted on shaft 10 is a hub member 15 having an outwardly projecting member 16 which is preferably ribbed as at 17 on its upper surface to strengthen the same.

Member 16 has a downturned lip 18 on its free end to assist in preventing overturning of a vase or potted plant. Disposed between the hub 15 and the collar 12 is a compression spring 21 and the lower end of the shaft 10 has a flattened portion 22 which enlarges the diameter of the same in opposite directions and this prevents the hub member 15 from sliding off of the shaft.

When the vase or potted plant holder 20 is placed in position on the ground the member 16 is allowed to slide downwardly by gravity onto the rim of the same and then the collar 12 is moved downwardly after loosening set screw 14 to compress the spring 21 to thereby resiliently press the member 16 against the upper edge of the flower retainer pot.

It is thus seen that I have provided a support for flower pots, vases and the like which will prevent overturning either by wandering dogs, high wind or other causes.

Although only one of the devices is shown in the drawings, I desire it to be understood that preferably two of the devices would be used, one on each of the opposite sides of a vase, pot and the like.

In the drawings and specification there has been set forth a preferred embodiment of the invention and, although specific terms are employed, they are used in generic and descriptive sense only, and not for purposes of limitation, the scope of the invention being defined in the claim.

I claim:

Apparatus for preventing the accidental overturning of a container having an open upper end and a bottom adapted to rest on the ground, said apparatus comprising in combination an elongated substantially round shaft having a pointed lower end adapted to be embedded in the ground adjacent said container, said shaft extending upwardly beyond the open upper end of said container and having a handle on the upper end thereof, a collar surrounding said shaft and means for releasably fixing said collar to said shaft at any desired point between the handle on the shaft and the open upper end of the container, a retaining member slidably mounted on said shaft below said collar; said retaining member comprising a hub portion encircling said shaft, an intermediate portion extending radially from the hub portion and a free end portion extending downwardly from said intermediate portion, a centrally disposed longitudinally extending vertical rib on said intermediate portion, said rib merging at opposite ends with the hub portion and with the free end portion of said retaining member; said shaft having an enlarged portion thereon adjacent the pointed lower end thereof, said retaining member being slidable along said shaft between said collar and said enlarged portion and being thereby engageable with the upper edge of the container adjacent said shaft in such a manner that the under surface of the intermediate portion on the retaining member rests on said upper edge of the container and the free end portion of the retaining member extends downwardly within the open upper end of said container, and a compression spring disposed between the collar and the retaining member whereby said collar may be spaced adjacent said retaining member to compress said spring to resiliently urge said retaining member against the container.

References Cited in the file of this patent

UNITED STATES PATENTS

| 783,099   | Bryant    | Feb. 21, 1905 |
| 1,291,359 | Babcock   | Jan. 14, 1919 |
| 1,636,562 | Hick      | July 19, 1927 |
| 2,505,885 | Davis     | May 2, 1950   |
| 2,563,097 | Boisselier | Aug. 7, 1951 |